United States Patent [19]
Scott et al.

[11] Patent Number: 5,358,614
[45] Date of Patent: Oct. 25, 1994

[54] METHOD AND APPARATUS FOR THE REMOVAL OF BIOCONVERSION OF CONSTITUENTS OF ORGANIC LIQUIDS

[75] Inventors: Timothy Scott, Knoxville; Charles D. Scott, Oak Ridge, both of Tenn.

[73] Assignee: Martin Marietta Energy Systems, Inc., Oak Ridge, Tenn.

[21] Appl. No.: 116,772

[22] Filed: Sep. 3, 1993

[51] Int. Cl.$^5$ ............................................. B03C 5/00
[52] U.S. Cl. .................... 204/186; 204/190; 204/302; 204/305
[58] Field of Search ............... 204/189, 190, 305, 149, 204/186, 191, 302

[56] References Cited

U.S. PATENT DOCUMENTS

| | | | |
|---|---|---|---|
| 4,329,211 | 5/1982 | Plantes et al. | 204/149 |
| 4,767,515 | 8/1988 | Scott et al. | 204/186 |
| 4,941,959 | 7/1990 | Scott | 204/186 |
| 5,122,360 | 6/1992 | Harris et al. | 423/592 |
| 5,207,973 | 5/1993 | Harris et al. | 266/170 |
| 5,262,027 | 11/1993 | Scott | 204/186 |

Primary Examiner—John Niebling
Assistant Examiner—Arun S. Phasge
Attorney, Agent, or Firm—Preston H. Smirman; Shelley L. Stafford; Harold W. Adams

[57] ABSTRACT

A method and apparatus for the removal or conversion of constituents from bulk organic liquids. A countercurrent biphasic bioreactor system is utilized to disperse and recoalesce a biocatalyst contained in the aqueous liquid phase into the organic liquid phase containing the constituent. Two transient, high-intensity electrical fields rupture the aqueous drops into a plurality of microdroplets and induce continuous coalescence and redispersion as the microdroplets travel through the organic phase, thus increasing surface area. As the aqueous microdroplets progress through the organic phase, the biocatalyst then reacts with the constituent to produce a product which is then removed from the bioreactor in the aqueous phase or retained in the organic phase. The organic liquid, now free of the original constituents, is ready for immediate use or further processing.

22 Claims, 1 Drawing Sheet

METHOD AND APPARATUS FOR THE REMOVAL OF BIOCONVERSION OF CONSTITUENTS OF ORGANIC LIQUIDS

This invention was made with Government support under contract DE-AC05-84OR21400 awarded by the U.S. Department of Energy to Martin Marietta Energy Systems, Inc. and the Government has certain rights in this invention.

FIELD OF THE INVENTION

The present invention relates generally to the removal or bioconversion of constituents of organic liquids to other products, and more particularly it relates to a countercurrent biphasic bioreactor system, containing an organic and aqueous liquid phase (the aqueous liquid phase contains biocatalysts (such as microorganisms or enzymes)) which convert the constituent into a product that is easily removed, which utilizes transient high-intensity electrical fields to disperse and recoalesce the aqueous liquid phase as it flows through the organic liquid phase which results in increased reaction surface area.

BACKGROUND OF THE INVENTION

Useful organic liquids, such as various forms of petroleum, oil, fuel, organic solvents, and other hydrocarbons, occasionally contain one or more constituents of interest. Sometimes these constituents are contaminants and sometimes they are commercially valuable chemicals. If the constituent is either a contaminant or a commercially valuable chemical, it would be preferable to process it in such a manner as to be able to remove it from the useful organic liquid. These constituents are sometimes referred to as substrates, in that they are substances that can be acted upon by other substances (such as various biocatalysts). These constituents may also be in the form of various organic liquids or be contained in various organic liquids. For example, these constituents may be heteroatom compounds (such as organically bound sulfur or nitrogen), heavy metals (such as those contained in substituted porphyrins), or other organic constituents of interest. The major fraction of the organic liquid is sometimes referred to as the "bulk" organic phase, since most of its volume is comprised of this organic liquid, whereas usually a small volume is comprised of the constituent of interest. Some of these constituents are classified as hazardous wastes by various environmental regulatory agencies. Disposal of these "contaminated" organic liquids is very wasteful, difficult, and expensive. Because these organic liquids would be useful if not for the constituents they contain, it is preferable to identify and develop an acceptable approach which would remove these constituents. If the constituents were solids, removal could be accomplished relatively simply through a series of filtration or sedimentation steps. On the other hand, constituents which are organic compounds or contained in organic compounds are, to a certain extent, miscible in the bulk organic liquids. Miscibility is generally defined as the tendency or capacity of two or more liquids to form a uniform blend, that is, to dissolve in each other. The degrees of miscibility are generally referred to as total miscibility, partial miscibility, and immiscibility. Difficulties are encountered when attempting to separate the two or more different types of organic liquids when they possess partial or total miscibility. What is needed is a method and apparatus for safely, quickly, and economically bioconverting or removing the constituents in the bulk organic liquid whereby the bulk organic liquid is available for immediate use and the useful constituents are available for further processing.

OBJECTS OF THE INVENTION

Accordingly, it is an object of the present invention to provide a new and improved method for removing constituents from organic liquids.

It is another object of the present invention to provide a new and improved method for converting constituents in organic liquids into useful products.

It is another object of the present invention to provide a new and improved apparatus for removing constituents from organic liquids.

It is another object of the present invention to provide a new and improved apparatus for converting constituents in organic liquids into useful products.

Further and other objects of the present invention will become apparent from the description contained herein.

SUMMARY OF THE INVENTION

In accordance with one aspect of the present invention, the foregoing and other objects are achieved by:
- introducing an organic liquid into a vessel, the organic liquid containing at least one constituent, the vessel having at least one inlet and at least one outlet;
- introducing an aqueous liquid in droplet form into the vessel whereby the aqueous liquid contacts the organic liquid, the droplets flowing countercurrently with respect to the organic liquid, the droplets containing at least one biocatalyst;
- subjecting the droplets upon entry into the organic liquid to a first electrical field whereby the droplets rupture to form a plurality of microdroplets; the microdroplets dispersing and recoalescing during countercurrent flow through the organic liquid;
- subjecting the droplets during countercurrent flow through the organic liquid to a second electrical field whereby the recoalesced droplets continuously recoalesce and rupture to form a plurality of microdroplets;
- reacting the biocatalyst with the constituent to form a product, the reaction occurring in the interfacial zone between the microdroplets and the organic liquid, the reaction occurring in the microdroplets, the reaction removing the constituent from the organic liquid, the product being retained in the aqueous liquid;
- recovering the organic liquid; and
- recovering the aqueous liquid.

In accordance with another aspect of the present invention, the foregoing and other objects are achieved by:
- a vessel, the vessel having at least one inlet and at least one outlet;
- first introducing means for introducing the organic liquid containing at least one constituent into the vessel;
- second introducing means for introducing an aqueous liquid into the vessel, the aqueous liquid containing at least one biocatalyst, the biocatalyst reacting with the constituent to form a product, the product being retained in the aqueous liquid;

a first array of electrodes, the first array of electrodes being electrically insulated from the vessel;

a first power source, the first power source supplying electrical power to the first array of electrodes;

a second array of electrodes, the second array of electrodes being electrically insulated from the vessel;

a second power source, the second power source supplying electrical power to the second array of electrodes;

first removal means for removing the organic liquid; and second removal means for removing the aqueous liquid.

DETAILED DESCRIPTION OF THE PREFERRED EMBODIMENTS

Figure 1:
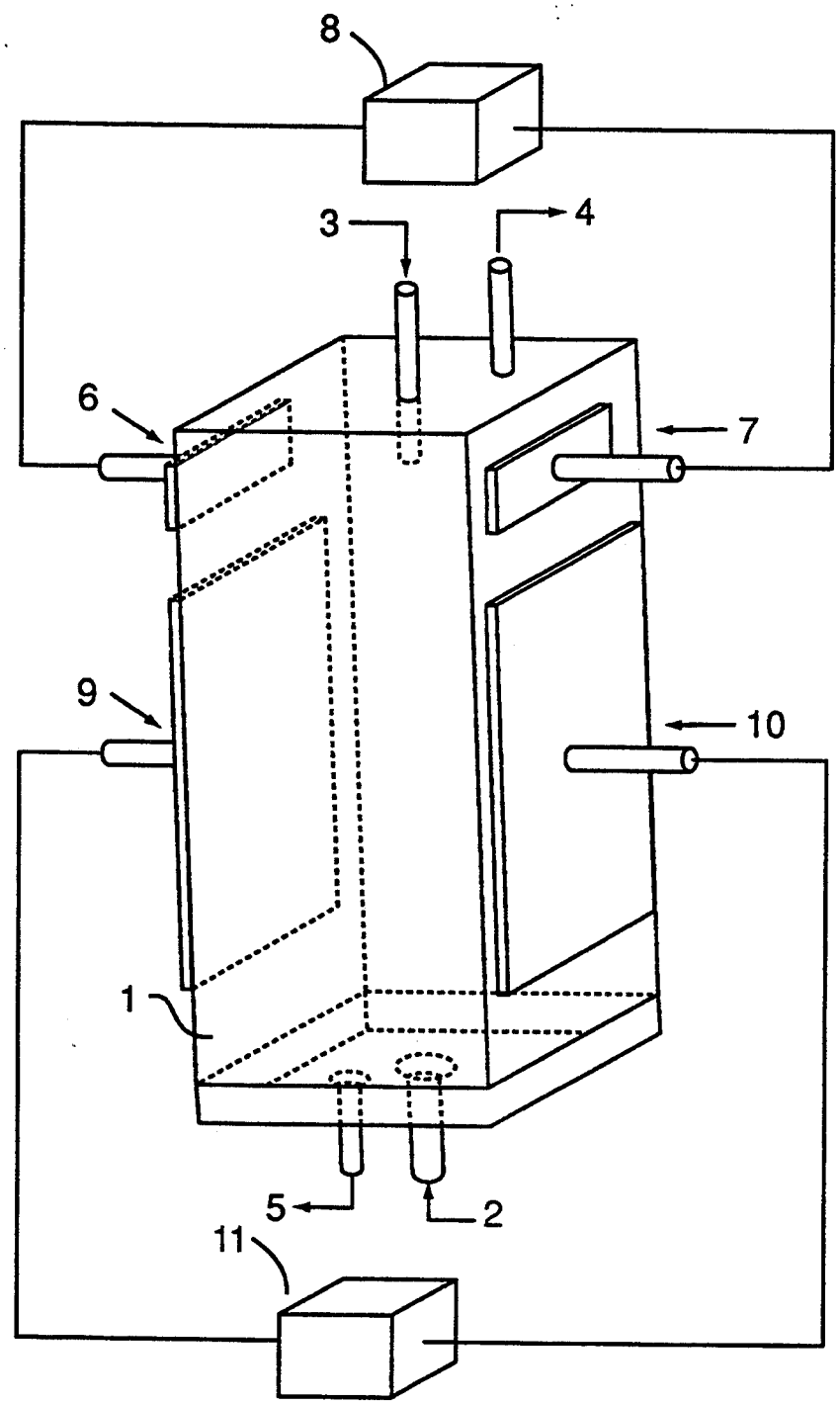
FIG. 1 is an illustration of a proposed steady state countercurrent biphasic bioreactor in accordance with one aspect of the present invention.

With reference to FIG. 1, a proposed steady state (or continuous) countercurrent biphasic bioreactor system in accordance with one aspect of the present invention consists of a vessel 1 having inlets (introducing means) 2 and 3 and outlets (removal means) 4 and 5. There is a first array of electrodes 6 and (electrically powered by power source 8) and a second array of electrodes 9 and 10 (electrically powered by power source 11).

The present invention utilizes a biocatalyst contained in the aqueous liquid phase to process or convert the constituent or constituents in the organic liquid phase into a product that can be removed by way of the aqueous phase or redissolved in the organic phase. It should be noted that more than one constituent can be simultaneously processed at the same time. This activity takes place within a bioreactor or similar type of vessel. It is necessary for the biocatalyst to come into contact with the constituent in order to convert the constituent (which functions as a substrate) into a product that can be removed by way of the aqueous phase or redissolved in the organic phase.

However, since the constituent is in the organic phase and the most appropriate biocatalysts, such as various microorganisms or enzymes, are not generally miscible in the organic phase, an approach was needed to overcome this obstacle. The present invention utilizes an emulsion phase contactor system. An emulsion is generally defined as a stable dispersion of one liquid in a second immiscible liquid. In the emulsion phase contactor system, an electrical field is used to atomize and disperse the aqueous phase into the organic phase. The emulsion phase contactor was previously developed for use in solvent extraction systems in which an aqueous-based phase could be continuously dispersed and recoalesced in a surrounding immiscible organic phase through the use of transient high-intensity (usually greater than about 5 kV/cm) electrical fields. A complete description of this and other related technology can be found in U.S. Pat. No. 4,767,515 to Scott et al., U.S. Pat. No. 4,941,959 to Scott, U.S. Pat. No. 5,122,360 to Harris et al., U.S. Pat. No. 5,207,973 to Harris et al., and U.S. Pat. No. 5,262,027 to Scott, the entire specifications of which are incorporated herein by reference.

In accordance with the present invention, the biocatalyst, which is contained in the aqueous phase, is introduced into the vessel by any conventional means, such as a pump. The aqueous phase is then dispersed into the organic phase whereby it can come into physical and chemical contact with the constituent of interest. The dispersion is accomplished by two transient, high-intensity electrical fields. The first electrical field accomplishes initial dispersion of the aqueous phase and a second electrical field which continually coalesces and redisperses the aqueous phase as it flows through the bioreactor. The biocatalyst will almost exclusively reside in the aqueous phase so that, potentially four mechanisms of substrate and product transport become important: 1) diffusion through the outer organic liquid film to the interface, 2) adsorption and desorption processes at the interface, 3) diffusion through an inner aqueous film, and 4) diffusion through the aqueous phase. Depending upon the properties of the included chemical species, any of these four events can solely or in combination with the others comprise the rate determining step in the process.

The present invention also utilizes a countercurrent biphasic (liquid-liquid) bioreactor. The bioreactor is said to be operating in a countercurrent mode in that the aqueous liquid phase is flowing countercurrently with respect to the organic liquid phase. During steady state operation, the bioreactor contains an organic phase (the organic phase contains the bulk organic liquid and the constituent) and an aqueous phase (the aqueous phase contains water and a biocatalyst). The biocatalyst reacts with the constituent to chemically or physically convert it to a safer product. In order to make the system of the present invention continuous, a bioreactor having at least one inlet and at least one outlet is necessary, so that the aqueous and organic liquids can be continuously introduced and removed. The organic phase is introduced into the "lower region" of the bioreactor through a nozzle, tube, hose or any number of similar devices and by any number of conventional means such as a pump. Once a desired quantity of organic phase has been placed into the bioreactor, the introduction of the aqueous phase can commence. This is accomplished by introducing droplets of the aqueous phase into an "upper region" of the organic phase. Introduction of the droplets can be accomplished through a nozzle, tube, hose or any number of similar devices (the device is preferably grounded). In this embodiment, the aqueous phase was introduced into the "upper region" of the bioreactor because it is assumed that the aqueous phase has a higher specific gravity than the organic phase, and thus it (the aqueous phase) will flow in a downwardly manner through the organic phase. Conversely, if the aqueous phase had a lower specific gravity than the organic phase, it (the aqueous phase) would be introduced into the "lower region" of the bioreactor so that it would flow in an upwardly manner through the organic phase.

As the aqueous droplets enter the organic phase, they are subjected to a first transient high-intensity electrical field immediately which ruptures and disperses the droplets into a plurality of microdroplets. These microdroplets have a diameter in the range of about 1 to about 50 microns. In essence, an emulsion has been created between the organic and aqueous phases. This first transient high-intensity electrical field is produced by a structured array of charged electrodes (powered by a power source or supply, such as a generator) which provide an electrical field with a substantially vertical component in close proximity to the nozzle or other introductory device. These electrodes may be either positively or negatively charged. The electrodes are electrically insulated from the bioreactor. This upper region of the bioreactor is referred to as the dispersion zone. These microdroplets have significantly increased surface area (on the order of about 100 to 1000 times more surface area) as compared to the droplets formed without an electrical field, thus reaction and mass transport efficiency is increased.

As the microdroplets descend through the organic phase they are then subjected to a second transient high-intensity electrical field which is substantially horizontal in nature, which continually disperses the droplets into a plurality of microdroplets and simultaneously induces recoalescence. This second transient high-intensity electrical field is produced by a structured array of vertically oriented alternating positive/negative electrodes (powered by a power source or supply, such as a generator) which produces primarily a horizontal electrical field. The electrodes are electrically insulated from the bioreactor. This lower region of the bioreactor is referred to as the operating channel.

When the aqueous liquid phase possesses a higher specific gravity than the organic liquid phase, the droplets and microdroplets of the aqueous phase tend to migrate to the lower region of the bioreactor. As an increasing number of microdroplets descend to the very bottom of the lower region of the bioreactor they form an aqueous phase layer which is distinct from the organic phase.

The reaction whereby the biocatalyst converts the constituent to a safer product occurs at the interface between the microdroplet and the bulk organic phase and within the microdroplets as they progress through the bioreactor. No reactions occur in the organic phase because the biocatalyst will not dissolve in the organic phase. It should be noted that in a continuous countercurrent biphasic bioreactor system of the present invention, 1–10% of the volume of the bioreactor contents will consist of aqueous phase liquids at any one given time. The other 90–99% of the volume of the bioreactor contents will generally consist of organic phase liquids. Therefore, it is critical to produce as much interfacial area (i.e., microdroplets) as possible in order to increase reaction efficiency. It is the utilization of the transient high-intensity electrical fields of the present invention which accomplishes this by the continuous dispersion and recoalescence of the microdroplets.

As the aqueous phase layer continues to accumulate at the bottom of the bioreactor, the aqueous phase can be removed through at least one outlet, which could be a nozzle, tube, hose or any number of similar devices. This aqueous phase now contains water, biocatalysts, and possible reaction products produced from the reacted constituent. The removed aqueous phase can be recycled back into the bioreactor or sent for further treatment. The outflowing organic phase, now free of its constituents or containing reaction products, is now available for immediate use or further processing. The organic phase is continuously removed from the bioreactor by any number of conventional means, such as a pump.

It is envisioned that the various steps involved with the method of the present invention can be controlled and automated by a programmed computer. The computer can very easily be programmed to add and remove various liquids at specified times and in specified amounts, activate the various electrical fields at certain times, for a certain duration, and for a certain strength, as well as handling any other system parameter such as temperature control or analytical probes.

An example in accordance with one aspect of the present invention is presented below:

EXAMPLE

The enzyme horseradish peroxidase (HRP) catalyzes the oxidation of a variety of substrates, especially phenols. HRP accepts the two oxidizing equivalents of peroxide and then transfers them to the hydrogen donor molecule (i.e. phenol) in separate one-step reactions. HRP/hydrogen peroxide was chosen as the enzyme/substrate complex and p-cresol as the secondary donor substrate. The enzymatic oxidation of p-cresol generates phenoxy radicals which react with other p-cresol molecules, forming water-insoluble polyaromatic products which precipitate out of aqueous solution. A unique reaction mechanism for the system in an aqueous phase has been developed. This mechanism involves deactivation of HRP compound I by hydrogen peroxide as well as nonproductive binding of the substrate (p-cresol) by HRP compound II. The final oxidative forms phenoxy radicals which react with p-cresol molecules in aqueous solution to form a p-cresol dimer which is a water insoluble ketone. The immiscible organic phase used is toluene. Experiments were carried out to investigate the effect of HRP on the continuous extraction of p-cresol from toluene into an aqueous phase in an electrically driven biphasic bioreactor. The organic phase contained 100 ppm p-cresol in toluene, while the aqueous phase contained $\sim 3.5 \times 10^{-8}$ molar HPR buffered to pH 9 by a boric acid/sodium borate buffer. $2 \times 10^{-3}$ molar hydrogen peroxide was added as the aqueous phase was introduced into the biphasic bioreactor. The experiments were carried out at 25° C. The system ran smoothly, displaying excellent electrical dispersion/coalescence behavior in both cases with and without the enzyme. The electric potential conditions were $+26$ kV and $-26$ kV spikes (however, spikes from $\pm 15$ to $\pm 45$ kV have been used on other systems) on the positive and negative operating channel electrodes respectively, and were run at a frequency of 414 Hz with an on-time (duty cycle) of 69% (in other cases the frequency and duty cycle have been varied from 10 to 5000 Hz and 50% to 95%, respectively). This resulted in a $+14$ kV and $-14$ kV offset between pulses. The operating channel electrodes were approximately 2.5 inches apart; hence, the nominal peak field strength was about 8 kV/cm in the operating channel. The single nozzle was surrounded with a square, charged electrode array which was negatively charged by the pulsing power supply ($-26$ kV, 414 Hz, 100% duty cycle) (spikes from $\pm 15$ to $\pm 45$ kV have been tried on other systems depending on the electrical properties of the liquids). The nominal peak field strength was similar to the operating channel at 8 kV/cm. Although the phase ratio was too large to see a large removal of p-cresol from the organic phase, (organic [40 cc/min]/aqueous [2 cc/min] for a ratio of 20) measurements from the outflowing aqueous phase indicated that the enzyme was able to totally react any p-cresol which transported into the aqueous phase as evidenced by analytical results obtained from gas chromatography for reaction substrate and products. With no electrical field, the aqueous phase formed very large drops and essentially no transport or reaction occurred. Hence, for the first time it has been demonstrated that the types of intense electrical fields used in this type of biphasic bioreactor do not have a detrimental effect on biocatalyst activity.

The present invention is applicable to any system that has an immiscible organic phase which contains other organic compounds that are desired to be removed or converted by biocatalysts. A major potential use for the present invention is the treatment of petroleum products, such as crude oil and its derivative products and fuels, for the removal of sulfur, nitrogen and metals (such as iron or nickel). Biocatalysts, either appropriate microorganisms (such as bacteria, yeast, or fungi) or enzymes, will be used in an aqueous phase in contact with the heavy oil phase to extract heteroatoms such as sulfur, nitrogen, or heavy metals (such as iron or nickel) from the oil phase by the bioconversion process. A similar approach can be adapted for processing coal-derived liquids. Bacteria such as *Sulfolobus acidocaldarius* or fungi such as *Paecilomyces TLi* can be utilized for the oxidative removal of organically bound sulfur with the resulting sulfate being removed in the aqueous phase. Sulfate-reducing bacteria such as *Desulfovibrio vulgaris* or gram-negative bacteria (isolated from various sludges or soils) can be used for the reductive removal of sulfur as $H_2S$ which will then exit the system as a gas when a hydrogen atmosphere is used. Microbial biomass such as that from *Micrococcus luteus* can be used as a bioadsorbent in the aqueous phase for metal removal. Additionally, bacteria, such as *Pseudomonas aeruginosa*, that interact with organic nitrogen may also be used. This same type of approach could be envisioned to work on liquid fuels derived from the thermal/chemical conversion of coal.

While there has been shown and described what are presently considered the preferred embodiments of the invention, it will be obvious to those skilled in the art that various changes and modifications can be made therein without departing from the scope of the invention defined by the appended claims.

What is claimed is:

1. A method for converting a constituent contained in an organic liquid into a product, comprising the steps of:
   introducing an organic liquid into a vessel, the organic liquid containing at least one constituent, the vessel having at least one inlet and at least one outlet;
   introducing an aqueous liquid in droplet form into the vessel to cause the aqueous liquid to contact the organic liquid, the droplets flowing countercurrently with respect to the organic liquid, the droplets containing at least one biocatalyst;
   subjecting the droplets upon entry into the organic liquid to a first electrical field to cause the droplets to rupture to form a plurality of microdroplets; the microdroplets dispersing and recoalescing during countercurrent flow through the organic liquid;
   subjecting the droplets during countercurrent flow through the organic liquid to a second electrical field to cause the recoalesced droplets to continuously recoalesce and rupture to form a plurality of microdroplets;
   reacting the biocatalyst with the constituent to form a product, the reaction removing the constituent from the organic liquid,
   recovering the organic liquid; and
   recovering the aqueous liquid.

2. A method in accordance with claim 1, wherein the organic liquid is a hydrocarbon.

3. A method in accordance with claim 1, wherein the constituent is an organic liquid.

4. A method in accordance with claim 1, wherein the constituent is a heteroatom containing compound.

5. A method in accordance with claim 1, wherein the constituent is a metal containing compound.

6. A method in accordance with claim 1, wherein the organic liquid and the aqueous liquid are continuously introduced into the vessel.

7. A method in accordance with claim 1, wherein the organic liquid and the aqueous liquid are continuously removed from the vessel.

8. A method in accordance with claim 1, wherein the biocatalyst is a microorganism.

9. A method in accordance with claim 8, wherein the microorganism is a bacterium.

10. A method in accordance with claim 8, wherein the microorganism is a fungus.

11. A method in accordance with claim 8, wherein the microorganism is a yeast.

12. A method in accordance with claim 1, wherein the biocatalyst is an enzyme.

13. A method in accordance with claim 1, wherein the reaction occurs substantially in the interfacial area between the microdroplet and the organic liquid.

14. A method in accordance with claim 1, wherein the first electrical field and the second electrical field are transient.

15. A method in accordance with claim 1, wherein the first electrical field is greater than about 5 kV/cm.

16. A method in accordance with claim 1, wherein the first electrical field is produced by an array of charged electrodes, the electrodes being electrically insulated from the vessel.

17. A method in accordance with claim 1, wherein the second electrical field is greater than about 5 kV/cm.

18. A method in accordance with claim 1, wherein the second electrical field is produced by an array of alternating positively and negatively charged electrodes, the electrodes being electrically insulated from the vessel.

19. A method in accordance with claim 1, wherein the product is retained in the organic liquid.

20. A method in accordance with claim 1, wherein the reaction occurs substantially within the microdroplet.

21. A method in accordance with claim 1, wherein the product is retained in the aqueous liquid.

22. An apparatus for converting a constituent contained in an organic liquid into a product, comprising:
   a vessel, the vessel having at least one inlet and at least one outlet;
   first introducing means for introducing the organic liquid containing at least one constituent into the vessel;
   second introducing means for introducing an aqueous liquid into the vessel, the aqueous liquid containing at least one biocatalyst, the biocatalyst reacting with the constituent to form a product;
   a first array of electrodes, the first array of electrodes being electrically insulated from the vessel;
   a first power source, the first power source supplying electrical power to the first array of electrodes;

a second array of electrodes, the second array of electrodes being electrically insulated from the vessel;

a second power source, the second power source supplying electrical power to the second array of electrodes;

first removal means for removing the organic liquid; and second removal means for removing the aqueous liquid.

* * * * *